US009432217B2

(12) United States Patent
Shibata

(10) Patent No.: US 9,432,217 B2
(45) Date of Patent: Aug. 30, 2016

(54) ELECTRONIC MAIL COMMUNICATION APPARATUS AND COMPUTER READABLE RECORDING MEDIUM

(75) Inventor: Takeshi Shibata, Anjo (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 13/046,590

(22) Filed: Mar. 11, 2011

(65) Prior Publication Data
US 2011/0238764 A1 Sep. 29, 2011

(30) Foreign Application Priority Data
Mar. 25, 2010 (JP) .................................. 2010-069388

(51) Int. Cl.
H04L 12/58 (2006.01)
H04N 1/00 (2006.01)
H04N 1/32 (2006.01)

(52) U.S. Cl.
CPC ........... *H04L 12/5855* (2013.01); *H04L 51/14* (2013.01); *H04N 1/00209* (2013.01);
(Continued)

(58) Field of Classification Search
CPC ..... H04L 51/28; H04L 12/58; H04L 12/585; H04N 2201/3218; H04N 2201/0017; H04N 2201/3208; H04N 1/00209; H04N 1/32641; H04N 2201/0094; H04N 1/00212; G06Q 10/107
USPC ........................................................ 709/206
See application file for complete search history.

(56) References Cited

U.S. PATENT DOCUMENTS 6,477,243 B1 * 11/2002 Choksi et al. ........... 379/100.06
2002/0194282 A1 * 12/2002 Saito .................. H04N 1/00137
709/206

(Continued)

FOREIGN PATENT DOCUMENTS

CN 1628292 A 6/2005
CN 101312434 A 11/2008
(Continued)

OTHER PUBLICATIONS

"Simple Mail Transfer Protocol," Wikipedia, Mar. 21, 2010, available at http://en.wikipedia.org/w/index.php?title=Simple_Mail_Transfer_Protocol (searched on Apr. 26, 2011). (Concise explanation of relevance provided in attached extended European Search Report.).

(Continued)

*Primary Examiner* — Vivek Srivastava
*Assistant Examiner* — Muhammad Raza
(74) *Attorney, Agent, or Firm* — Baker Botts L.L.P.

(57) ABSTRACT

An email communication apparatus includes: a receiver configured to receive an email; and a transmitter configured to transmit an acknowledgement mail relating to a delivery confirmation of the email. The receiver includes: a first reception unit configured to receive a first type email through an email server, the first type email designating a mail address as a transmission destination of the acknowledgement mail, and a second reception unit configured to receive a second type email without through the email server. If the first reception unit receives the first type email, the transmitter transmits, through the email server, the acknowledgement mail in which a transmission destination is the designated email address. If the second reception unit receives the second type email, the transmitter transmits, without through the email server, the acknowledgement mail in which a transmission destination is a network address of a transmission source device.

8 Claims, 5 Drawing Sheets

(52) U.S. Cl.
CPC ...... *H04N1/00212* (2013.01); *H04N 1/00244* (2013.01); *H04N 1/32117* (2013.01); *H04N 1/32641* (2013.01); *H04N 1/32657* (2013.01); *H04N 1/32678* (2013.01); *H04L 12/5825* (2013.01); *H04L 51/06* (2013.01); *H04N 2201/0094* (2013.01); *H04N 2201/3218* (2013.01); *H04N 2201/3278* (2013.01)

(56) References Cited

U.S. PATENT DOCUMENTS

| | | | |
|---|---|---|---|
| 2005/0225809 A1 | 10/2005 | Tonegawa | |
| 2007/0011255 A1* | 1/2007 | Miyamoto | G06Q 10/107 709/206 |
| 2007/0177199 A1* | 8/2007 | Okamoto | H04N 1/00209 358/1.15 |
| 2007/0258111 A1* | 11/2007 | Ooizumi | H04N 1/00214 358/402 |
| 2007/0271348 A1* | 11/2007 | Yang | 709/206 |
| 2008/0074705 A1* | 3/2008 | Shimoyama | H04N 1/00214 358/400 |
| 2008/0109520 A1* | 5/2008 | Tomita | 709/206 |
| 2008/0281624 A1* | 11/2008 | Shibata | 705/1 |
| 2009/0089387 A1* | 4/2009 | Hirano | 709/206 |
| 2009/0150493 A1 | 6/2009 | Tonegawa | |
| 2009/0222450 A1* | 9/2009 | Zigelman | H04L 67/06 |
| 2010/0153510 A1 | 6/2010 | Tonegawa | |
| 2010/0211783 A1* | 8/2010 | Lukaszyk et al. | 713/168 |
| 2011/0238764 A1* | 9/2011 | Shibata | 709/206 |

FOREIGN PATENT DOCUMENTS

| | | |
|---|---|---|
| JP | 2000-270151 A | 9/2000 |
| JP | 2002-027193 A | 1/2002 |
| JP | 2003-143351 A | 5/2003 |
| JP | 2003-271527 A | 9/2003 |
| JP | 2005-303614 A | 10/2005 |
| JP | 2007-180614 A | 7/2007 |
| JP | 2008-140355 A | 6/2008 |
| JP | 2009-100439 A | 5/2009 |
| JP | 2010-009263 A | 1/2010 |

OTHER PUBLICATIONS

European Patent Office, extended European Search Report for European Patent Application No. 11157201.2 (counterpart to above-captioned patent application), dated May 10, 2011.
Japan Patent Office, Notification of Reasons for Refusal for Japanese Patent Application No. 2010-069388 (counterpart Japanese patent application), dispatched Jul. 17, 2012.
State Intellectual Property Office of the People's Republic of China, Notification of First Office Action for Chinese Patent Application No. 201110072679.1 (counterpart to above-captioned patent application), mailed Jul. 2, 2013.

* cited by examiner (FIG. 2 CONTINUED)

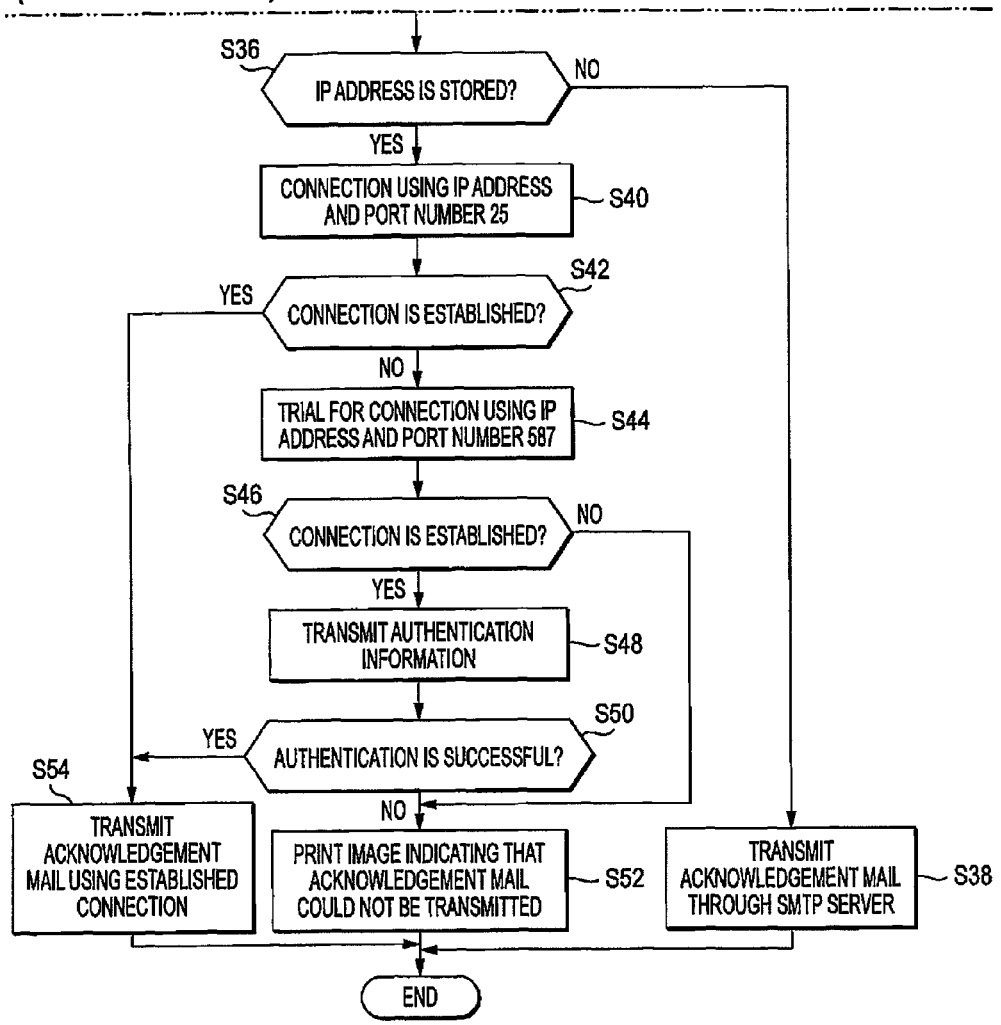

(FIG. 3 CONTINUED)

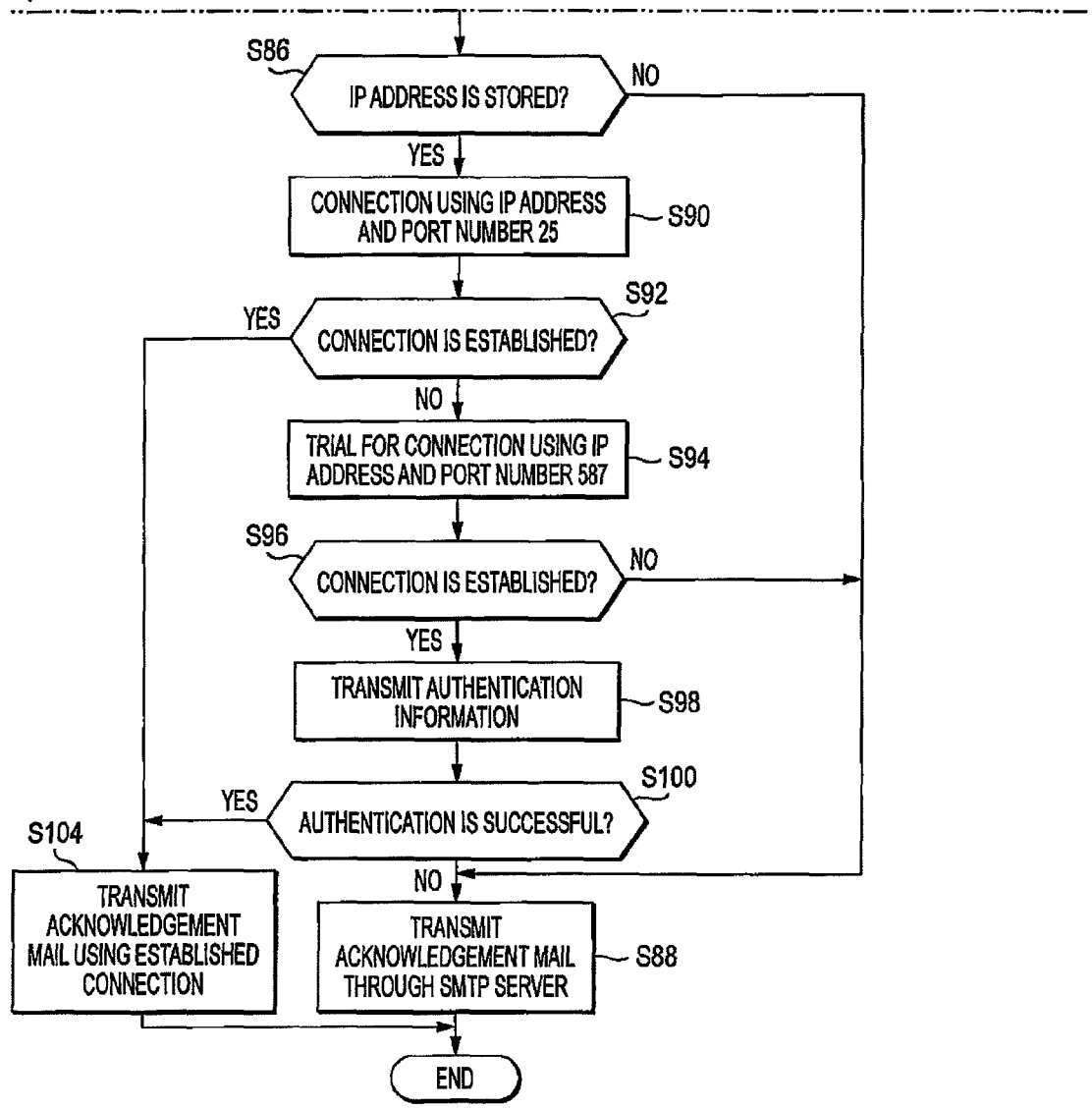

ELECTRONIC MAIL COMMUNICATION APPARATUS AND COMPUTER READABLE RECORDING MEDIUM

This application is based upon and claims the benefit of priority of Japanese Patent Application No. 2010-069388 filed on Mar. 25, 2010, the contents of which are incorporated herein by reference in its entirety.

BACKGROUND

The present invention relates to an electronic mail communication apparatus that can communicate an electronic mail (email).

A related image processing apparatus that receives an email through an email server is known. If the image processing apparatus receives an email from the email server, it transmits an acknowledgement mail, which indicates that the email is normally received, to a transmission source device of the email through the email server.

SUMMARY

In the related image processing apparatus, for example, if the image processing apparatus receives an email, which is not transmitted through the email server, the transmission source device may not receive an acknowledgement mail even though the image processing apparatus transmits the acknowledgement mail through the email server. For example, if a setting (for example, an email address, an account name, or a password) for using the email server is not made in the transmission source device, the transmission source device cannot connect to the email server and thus cannot receive the acknowledgement mail through the email server. In this specification, a technology for appropriately transmitting an acknowledgement mail is disclosed.

According to one aspect of the embodiment, there is provided an email communication apparatus comprising:
  a receiver configured to receive an email; and
  a transmitter configured to transmit an acknowledgement mail relating to a delivery confirmation of the email,
    wherein the receiver includes:
      a first reception unit configured to receive a first type email through an email server, the first type email designating a mail address as a transmission destination of the acknowledgement mail, and
      a second reception unit configured to receive a second type email not through the email server,
    wherein in a first case where the first reception unit receives the first type email, the transmitter transmits, through the email server, the acknowledgement mail in which a transmission destination is the designated email address, and
    wherein in a second case where the second reception unit receives the second type email, the transmitter transmits, not through the email server, the acknowledgement mail in which a transmission destination is a network address of a transmission source device from which the second type email is transmitted.

DESCRIPTION OF PREFERRED ILLUSTRATIVE EMBODIMENTS

Figure 1:
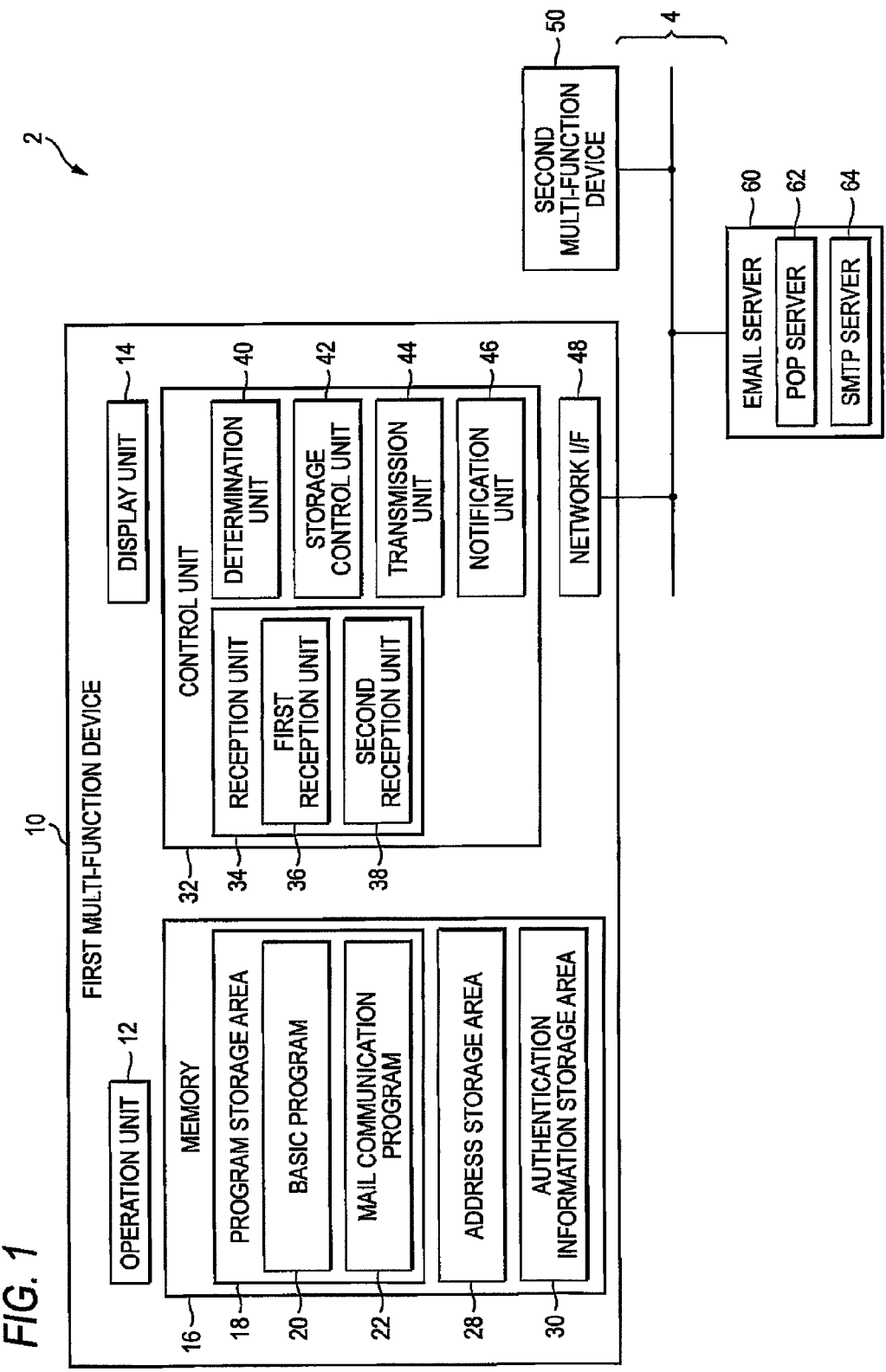
FIG. 1 shows a configuration of a network system.

First Illustrative Embodiment (Configuration of System)
A first illustrative embodiment will be described with reference to the drawings. As shown in FIG. 1, a network system 2 has a plurality of multi-function devices (peripheral devices) 10, 50 (two multi-function devices in this illustrative embodiment) and an email server 60. The respective multi-function devices 10, 50 can communicate with each other through a LAN 4. In addition, the respective multi-function devices 10, 50 can communicate with the email server 60 through the LAN 4.

(Configuration of Multi-Function Device)
Continuously, a configuration of the first multi-function device 10 will be described. In the meantime, the second multi-function 50 has the same configuration as the first multi-function device 10. The first multi-function device 10 has an operation unit 12, a display unit 14, a memory 16, a control unit 32 and a network interface 48. In the meantime, the first multi-function device 10 further has a printing execution unit and a scanner unit, which are not shown. The operation unit 12 has a plurality of keys (for example, ten keys and start key). A user can operate the operation unit 12 to input various instructions to the first multi-function device 10. The display unit 14 is a display for displaying a variety of information. The network interface 48 is connected to the LAN 4.

The memory 16 has a program storage area 18, an address storage area 28 and an authentication information storage area 30. The program storage area 18 stores respective programs 20, 22 with which the control unit 32 executes various processes. The basic program 20 includes a program with which the control unit 32 enables the printing execution unit to execute a printing process and a program with which the control unit enables the scanner unit to execute a scanning process. The mail communication program 22 includes a SMTP (Simple Mail Transfer Protocol) server program, a SMTP client program and a POP (Post Office Protocol) client program. The address storage area 28 stores a mail address of an external apparatus and/or IP address of the external apparatus. The authentication information storage area 30 stores authentication information of a first type and authentication information of a second type. The authentication information of a first type includes information (for example, a user name set in the first multi-function device 10 and a password for a POP server of the first multi-function device 10) that is used to authenticate the first multi-function device 10 by a POP server 62 that will be described below. The authentication information of a second type includes information (for example, ID of the first multi-function device 10 and a password for an external apparatus of the first multi-function device 10) that is used to authenticate the first multi-function device 10 by an external apparatus (for example, second multi-function device 50).

The control unit 32 executes a variety of processes in accordance with the respective programs 20, 22 stored in the program storage area 18. The control unit 32 executes a process in accordance with the mail communication program 22, so that the functions of a reception unit 34, a determination unit 40, a storage control unit 42, a transmission unit 44 and a notification unit 46 are realized. In the meantime, the reception unit 34 has a first reception unit 36 and a second reception unit 38.

(Configuration of Email Server)

Continuously, a configuration of the email server 60 will be described. The email server 60 is connected to the LAN 4. Mail addresses, which are set in external apparatus (for example, multi-function devices 10, 50) performing email communication through the email server 60, are registered in the email server 60. The email server 60 has a POP server 62 and a SMTP server 64. The SMTP server 64 determines whether an email server (rear part of @ in a mail address of a transmission destination), which is designated as a transmission destination of a received email, indicates the email server 60 or a specific email server to which a specific SMTP server different from the SMTP server 64 belongs. If the email server, which is designated as a transmission destination, indicates the email server 60, the SMTP server 64 stores the received email in a mailbox, in correspondence to a user name (front part of @ in the mail address of the transmission destination) that is designated as the transmission destination. In the meantime, if the email server, which is designated as a transmission destination, indicates the specific email server, the SMTP server 64 transmits the received email to a SMTP server of the specific email server. The SMTP server 64 also receives an email transmitted from another SMTP server and stores the email in the mailbox of the email server 60 in correspondence to a user name that is designated as the transmission destination.

The POP server 62 monitors whether a request for connection is received from the external apparatuses (for example, multi-function devices 10, 50) connected to the LAN 4. If a request for connection is received from the external apparatuses, the POP server 62 transmits a request for transmission of authentication information (user name that is account information of the external apparatus and password for a POP server) for authenticating the external apparatuses to the external apparatuses. The POP server 62 authenticates the external apparatuses by using the authentication information received from the external apparatuses. If the authentication is successful, the POP server 62 transmits the email, which is stored in correspondence to the user name of the account information for which the authentication is completed, to the external apparatuses. Thereby, the external apparatuses can receive the email.

(Process Executed by First Multi-Function Device 10)

Continuously, an email receiving process that is executed by the control unit 32 of the first multi-function device 10 will be described. In the meantime, a control unit (not shown) of the second multi-function device 50 also executes the same process. If the first multi-function device 10 is turned on, the control unit 32 starts an email receiving process shown in FIG. 2 in accordance with the mail communication program 22. In the meantime, if the power is on, the control unit 32 starts a timer (not shown). The control unit 32 determines whether a predetermined time period has elapsed through measured time of the timer (S12). If a result of S12 is YES, the control unit proceeds to S14 and if a result thereof is NO, the control unit proceeds to S24. Here, if a result of S12 is YES, the control unit 32 resets the timer and restarts.

In S14, the first reception unit 36 transmits a request for connection to the POP server 62 and connected with the POP server 62. Continuously, the first reception unit 36 receives a request for transmission of the authentication information of a first type from the POP server 62. In accordance with the request for transmission, the first reception unit 36 transmits the authentication information of a first type (which includes user name and password for a POP server) that is stored in the authentication information storage area 30 (S16). The POP server 62 uses the received authentication information of a first type to authenticate the first multi-function device 10. If the first multi-function device 10 is successfully authenticated, the POP server 62 transmits an email, which is stored in correspondence to the user name transmitted from the first multi-function device 10, to the first multi-function device 10. The first reception unit 36 receives the email from the POP server 62 (S18). Hereinafter, the email that is received through the POP server 62 in S18 is referred to as "specific first type email."

Continuously, the storage control unit 42 stores a mail address, which is designated as a replay destination of the specific first type email, in the specific first type email (S20). Specifically, the storage control unit 42 stores a mail address of a reply destination (i.e., mail address corresponding to 'Reply-to'), which is described in a header of the specific first type email, in the address storage area 28. In the meantime, if there is no mail address corresponding to 'Reply-to,' the storage control unit 42 stores a mail address of a transmission source (i.e., mail address corresponding to 'From'), which is described in the header of the specific first type email, in the address storage area 28. Meanwhile, if a plurality of specific emails of a first type is received in S18, the storage control unit 42 stores, for each of the specific emails of a first type, a mail address of a reply destination or transmission source, which is described in the header of the specific first type email, in the address storage area 28. Continuously, the first reception unit 36 disconnects with the POP server 62 (S22) and the control unit proceeds to S34.

For example, the second multi-function device 50 transmits the specific first type email through the SMTP server 64 by using the SMTP program that is stored in the second multi-function device 50. In the meantime, the second multi-function device 50 typically designates, as the mail address of the reply destination (Reply-to) of the header of the specific first type email, a mail address of the second multi-function device 50 (however, a preset mail address of another device may be designated). More specifically, the 'mail address of the second multi-function device 50' is a mail address with which the second multi-function device 50 communicates (transmits and receives) an email and is a mail address that is set in the second multi-function device 50. In the meantime, the second multi-function device 50 designates, as the mail address of the transmission source (From) of the specific first type email, the mail address of the second multi-function device 50. In addition, the second multi-function device 50 designates, as the mail address of the transmission destination (To) of the header of the specific first type email, a mail address of the first multi-function device 10. More specifically, the 'mail address of the first multi-function device 10' is a mail address with which the first multi-function device 10 communicates (transmits and receives) an email and is a mail address that is set in the first multi-function device 10. The specific first type email is supplied to the POP server 62. The first multi-function device 10 (first reception unit 36) receives the specific first type email through the POP server 62 by using the POP client program (S16 and S18).

In S24, the second reception unit 38 determines whether a connection with an external apparatus is established. More specifically, if the second reception unit 38 receives a connection request packet from an external apparatus, it transmits a reply packet to the connection request packet to the external apparatus. Thereby, the connection with the external apparatus is established. In the below, an example will be described in which the external apparatus that transmits the connection request packet is the second multi-function device 50. If a result of S24 is YES, the control unit proceeds to S26 and if a result thereof is NO, the control unit returns to S12. In S26, the storage control unit 42 stores the IP address of the second multi-function device 50 in the address storage area 28. The IP address of the second multi-function device 50 is included in the connection request packet. Next, the second reception unit 38 receives an email from the second multi-function device 50 (S28). In the below, an email, which is directly received from the second multi-function device 50 without going through the POP server 62 in S28, is referred to as an 'specific second type email.' Like S20, the storage control unit 42 stores the mail address of the reply destination or transmission source, which is described in the header of the specific second type email, in the address storage area 28 (S30). Continuously, the second reception unit 38 disconnects with the second multi-function device 50 (S32) and the control unit proceeds to S34.

For example, the second multi-function device 50 directly transmits the specific second type email to the SMTP server of the first multi-function device 10 (namely, the first multi-function device 10 that operates in accordance with the SMTP server program) without going through the SMTP server 64 by using the SMTP client program stored in the second multi-function device 50. In the meantime, such communication of the email is often referred to as 'direct SMTP.' In the meantime, a header of the specific second type email, which is transmitted by the direct SMTP, is also described with mail addresses of a transmission destination (To), a reply destination (Reply-to) and a transmission source (From). In the direct SMTP, since the SMTP server that becomes a transmission destination of the email is the first multi-function device 10, it is not necessary to use the mail addresses that are registered in the email server 60. In addition, the second multi-function device 50 typically designates, as mail addresses of the reply destination and the transmission source of the header of the specific second type email, the mail address of the second multi-function device 50. In another illustrative embodiment, if the second multi-function device 50 receives an email only by the direct SMTP, for example, the mail address of the second multi-function device 50 is not necessarily registered in the email server 60. The first multi-function device 10 (second reception unit 38) directly receives the specific second type email from the second multi-function device 50 without going through the POP server 62 by using the SMTP server program (S26 and S28).

Although not shown in the flow chart, the control unit 32 executes following processes before executing a process of S34. Specifically, if an email (specific first type email or specific second type email) is received, the control unit 32 determines whether an acknowledgement mail reply instruction indicating that an acknowledgement mail should be replied is described in a header of the email. If a positive determination is made, the control unit 32 executes a process of S34. If a negative determination is made, the control unit 32 ends the email receiving process and returns to S12 without executing processes after S34, i.e., without transmitting an acknowledgement mail.

In S34, the transmission unit 44 prepares an email in which the mail address stored in the memory 16 in S20 or S30 is designated as a transmission destination (namely, an email in which the mail address stored in S20 or S30 is described in correspondence to 'to' of the header). In S34, the transmission unit 44 prepares an email including the text (body) in which a content describing that the first multi-function device 10 has received an email is described. In the below, the email prepared in S34 is referred to as 'acknowledgement mail.' Next, the determination unit 40 determines whether the IP address is stored in the address storage area 28 (S36). If a result of the determination is YES, the control unit proceeds to S40 and if a result thereof is NO, the control unit proceeds to S38. In the meantime, a result of the determination is YES in S36 that is executed via the process of S26. In other words, the case where a result of the determination is YES in S36 means that the specific second type email has been received. In the meantime, a result of the determination is NO in S36 that is executed without via the process of S26 (S36 that is executed via the processes of S14 to S22). In other words, the case where a result of the determination is NO in S36 means that the specific first type email has been received.

In S38, the transmission unit 44 transmits the acknowledgement mail, which is prepared in S34, through the SMTP server 64 by using the SMTP client program. Thereby, for a case where the transmission source device of the specific first type email is the second multi-function device 50, for example, the second multi-function device 50 can receive the acknowledgement mail if a result of the determination is YES in S12 and thus the second multi-function device connects with the POP server 62. In addition, if a plurality of mail addresses is stored in the address storage area 28 in S20, for each of the mail addresses, a plurality of emails is prepared in S34 by using the corresponding mail addresses and then transmitted in S38. In the meantime, if the process of S38 is completed, the control unit 32 erases the mail address stored in S20.

In S40, the transmission unit 44 tries to connect with the second multi-function device 50 (for example, TCP/IP connection) by using a combination of the IP address stored in S26 (namely, IP address of the second multi-function device 50) and a port number '25.' In the meantime, the port number '25' is a port number within a range (0~1023) of port numbers that are well-known ports and is a port number that is generally used in the SMTP mail communication. Specifically, the transmission unit 44 designates, as a reception destination IP address, the IP address stored in S26 and transmits a specific packet in which the port number '25' is designated as a reception destination port number. If the second multi-function device 50 receives the specific packet, it determines whether the reception destination port number '25' of the specific packet is set in the second multi-function device 50 as a port number for executing the SMTP communication. If a result of the determination is positive, the second multi-function device 50 transmits a reply packet to the specific packet to the first multi-function device 10. The transmission unit 44 monitors whether the reply packet is received from the second multi-function device 50 (S42). If the reply packet is received, the transmission unit 44 determines that the connection with the second multi-function device 50 is established (YES in S42) and the control unit proceeds to S54. In the meantime, if a result of the monitoring is YES in S42, the second multi-function device 50 determines YES in S24.

In the meantime, there is a situation in which the second multi-function device 50 cannot use the port number '25.' For example, if the second multi-function device 50 stops using the port number '26' for security purposes, the second multi-function device 50 cannot use the port number '25.' In this case, the second multi-function device 50 does not transmit the reply packet to the first multi-function device 10. As a result, the transmission unit 44 determines NO in S42 and the control unit proceeds to S44.

In S44, the transmission unit 44 tries to connect with the second multi-function device 50 by using a combination of the IP address stored in S26 (namely, IP address of the second multi-function device 50) and a port number '587.' The trial for connection in S44 is the same as the trial for connection in S40. In the meantime, the port number '587' is a port number that is known as a submission port of an email and is a port number that is generally used in the SMTP mail communication. In particular, the port number is a port number that is generally used in mail communication in which authentication (SMTPAUTH) is executed. The transmission unit 44 monitors whether the reply packet is received from the second multi-function device 50 (S46). If a result of the monitoring is YES, the control unit proceeds to S48 and if a result thereof is NO, the control unit proceeds to S52. In S48, the transmission unit 44 transmits the authentication information of a second type (ID of the first multi-function device 10 and password for an external apparatus of the first multi-function device 10), which is stored in the authentication information storage area 30, to the second multi-function device 50. The second multi-function device 50 determines whether the authentication information of a second type is stored in the second multi-function device 50. If the authentication information of a second type is stored in the second multi-function device 50, the second multi-function device 50 determines that the authentication is successful. If the authentication information of a second type is not stored in the second multi-function device 50, the second multi-function device determines that the authentication ends in failure. Therefore, for successful authentication, a user should register the ID of the first multi-function device 10 and the password for an external apparatus of the first multi-function device 10 in the second multi-function device 50 in advance. The second multi-function device 50 transmits the authentication result to the first multi-function device 10.

If the authentication result is received from the second multi-function device 50, the transmission unit 44 determines whether the authentication result is successful (S50). If a result of the determination is YES, the control unit proceeds to S54, and if a result of the determination is NO, the control unit proceeds to S52. If a result of the determination is YES in S50, the second multi-function device 50 determines YES in S24. In the meantime, if a result of the determination is NO in S50, the transmission unit 44 does not transmit an acknowledgement mail. In S52, the notification unit 46 enables the printing executing unit to print a specific image indicating that an acknowledgement mail could not be transmitted. The specific image further includes the information indicating the mail address stored in S30. Accordingly, the user can see the specific image and thus know that an acknowledgement mail could not be transmitted and the mail address that should be a transmission destination of an acknowledgement mail. The user can transmit a new email in which the mail address is designated as a transmission destination.

Meanwhile, in S54, the transmission unit 44 uses the connection established in S42 or connection established in S46 to transmit the acknowledgement mail prepared in S34 to a transmission destination having the IP address stored in S26, without going through the SMTP server 64. The transmission unit 44 executes the process of S54 by using the SMTP client program. As a result, the second multi-function device 50 receives the acknowledgement mail without going through the POP server 62 in S28. In addition, if the process of S52 or S54 ends, the control unit 32 erases the IP address stored in S26 and the mail address stored in S30.

This illustrative embodiment has been specifically described. If the specific first type email is received (i.e., an email is received through the POP server 62), the first multi-function device 10 transmits an acknowledgement mail to the external apparatus, which is a transmission source of the specific first type email, through the SMTP server 64. The external apparatus that can receive the specific first type email is connected to the email server (for example, email server 60). Therefore, the external apparatus that is a transmission source of the specific first type email can receive the acknowledgement mail that is transmitted through the SMTP server 64. In other words, the first multi-function device 10 can appropriately transmit the acknowledgement mail, as a reply to the specific first type email.

In the meantime, if the specific second type email is received, the first multi-function device 10 tries to directly connect with the second multi-function device 50 that is a transmission source of the specific second type email. If the connection between the first multi-function device 10 and the second multi-function device 50 is established, the first multi-function device 10 directly transmits the acknowledgement mail to the second multi-function device 50 that is directly connected, without going through the SMTP server 64. As a result, even if the second multi-function device 50 cannot receive an email through the email server 60, the second multi-function device 50 can receive the acknowledgement mail. In other words, the first multi-function device 10 can appropriately transmit the acknowledgement mail, as a reply to the specific second type email.

Figure 2:
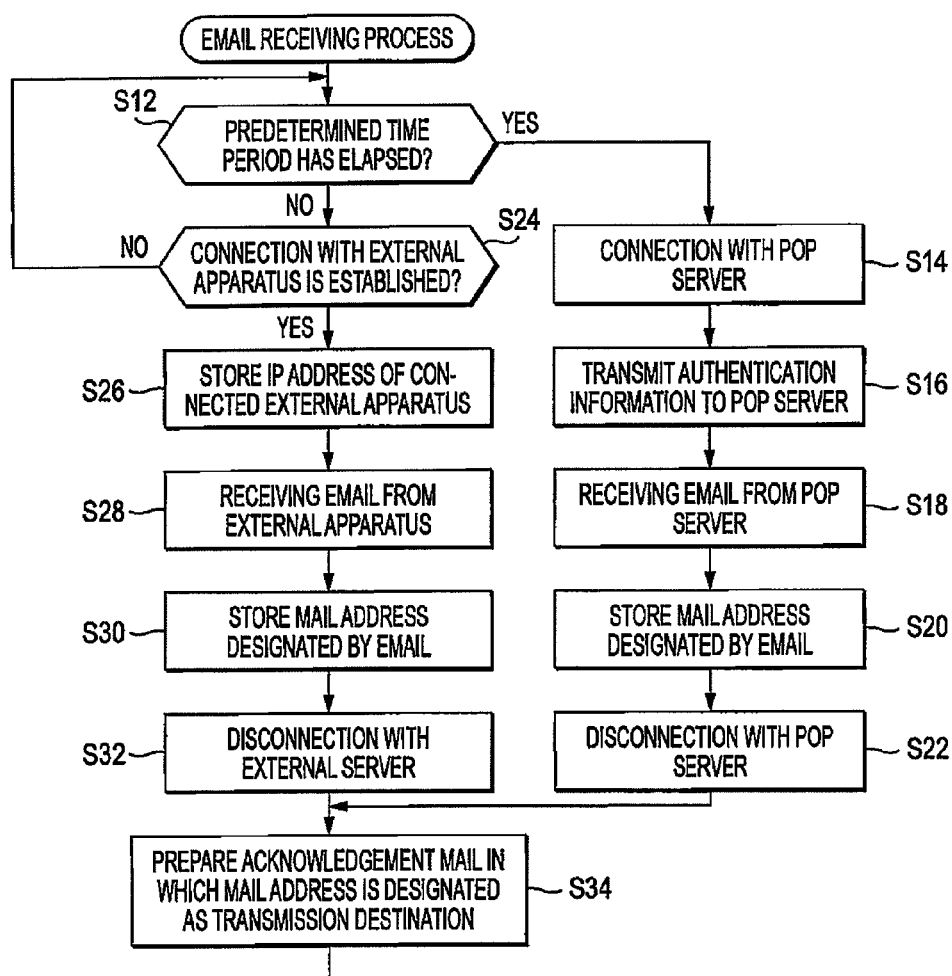
FIG. 2 is a flow chart of a mail receiving process that is executed by a multi-function device of a first illustrative embodiment.

If trying to connect with the second multi-function device 50, the first multi-function device 10 uses the port number '25' (refer to S40 in FIG. 2). The port number '25" is a port number that is generally used in the email communication, and a possibility that the second multi-function device 50 can use the port number is high. Accordingly, a possibility that the first multi-function device 10 will establish the connection with the second multi-function device 50 is high.

If the first multi-function device 10 cannot establish the connection with the second multi-function device 50 by using the port number '25,' the first multi-function device uses the port number '587' to try the connection with the second multi-function device 50 (S44 in FIG. 2). The port number '587' is a port number that is used if the using of the port number '25' is stopped for security purposes. Accordingly, if the connecting using the port number '25' is not established, the first multi-function device can establish the connection with the second multi-function device 50 by using the port number '587' that is the submission port. In the meantime, the port number '587" requires the authentication (SMTPAUTH). The first multi-function device 10 transmits the authentication information of a second type (ID of the first multi-function device 10 and password for an external apparatus of the first multi-function device 10) to the second multi-function device 50, so that the first multi-function device 10 and the second multi-function device 50 can establish the connection using the port number '587.'

If the connection with the second multi-function device 50 is not established, the first multi-function device 10 outputs the specific image. Thereby, a user can know that an acknowledgement mail could not be transmitted and can notify a user of the second multi-function device 50 that the specific second type email has been received by the first multi-function device 10.

In the meantime, as can be clearly seen from the above descriptions, the first multi-function device 10 is an example of the 'communication apparatus.' The POP server 62 is an example of the 'email receiving server' and the SMTP server 64 is an example of the 'email transmitting server.' The IP address is an example of the 'network address.' The port number '25' is an example of the 'first port number' and the port number '587' is an example of the 'second port number.' The specific image is an example of the 'specific information' indicating that an acknowledgement mail could not be transmitted.

Second Illustrative Embodiment

Figure 3:
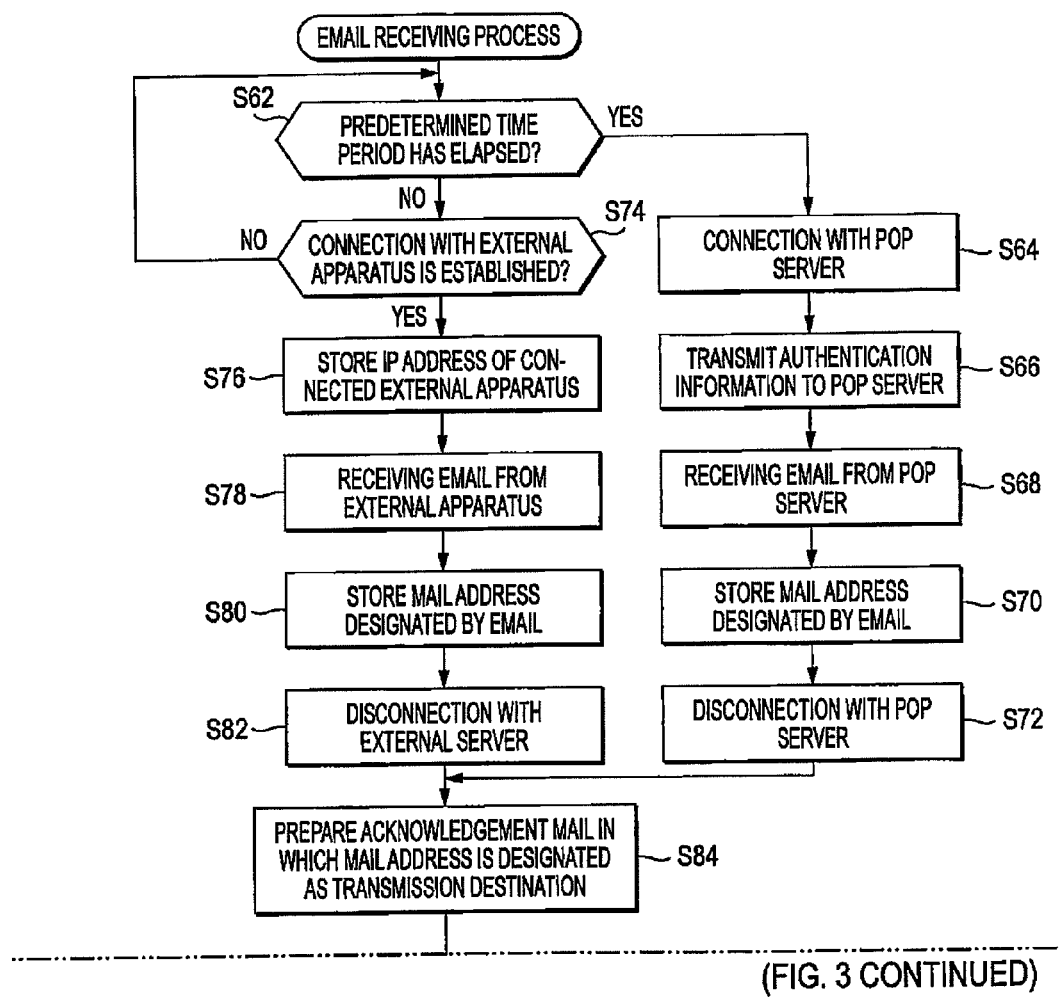
FIG. 3 is a flow chart of a mail receiving process that is executed by a multi-function device of a second illustrative embodiment.

The differences with the first illustrative embodiment will be described. As shown in FIG. 3, the control unit 32 of the first multi-function device 10 of the second illustrative embodiment executes the email receiving process. The processes of S62 to S100 of FIG. 3 are the same as those of S12 to S50 of FIG. 2. In the second illustrative embodiment, if a result of the determination is NO in S100 (S50 in FIG. 2), the control unit 32 does not print the specific image. If a result of the determination is NO in S100, the control unit proceeds to S88. In other words, the transmission unit 44 transmits an acknowledgement mail to a transmission destination having the specific mail address, through the SMTP server 64. In the meantime, the process of S104 is the same as that of S54 in FIG. 2.

If the connection with the second multi-function device 50 is not established using the port numbers '25' and '587,' the first multi-function device 10 of the second illustrative embodiment transmits the acknowledgement mail to a transmission destination having the mail address of the transmission source or reply destination stored in the address storage area 28 in S70 or S80 of FIG. 3, through the SMTP server 64. According to this configuration, if the second multi-function device 50 can receive an email through the email server 60, the first multi-function device can appropriately transmit the acknowledgement mail to the second multi-function device 50.

Modified Embodiments (1) In S52 of FIG. 2, the notification unit 46 enables the printing execution unit to print the specific image. Instead, the notification unit 46 may display the specific image on the display unit 14. In the meantime, the specific image may be a specific image indicating that the first multi-function device could not be connected to the external apparatus, or a specific image urging a user of the first multi-function device to notify a user of the transmission source device of the specific email that the first multi-function device 10 has received the specific email. These specific images are also an example of the 'specific information' indicating that an acknowledgement mail could not be transmitted.

(2) In S26 of FIG. 2, the storage control unit 42 stores the IP address of the external apparatus. However, the storage control unit 42 may store a domain name of the external apparatus. In this case, in S36, the determination unit 40 determines whether a domain name is stored in the address storage area 28. If a domain name is stored, the transmission unit 44 may access to a domain name server to obtain an IP address corresponding to the domain name. In this modified embodiment, the domain name is an example of the 'network address.'

(3) In S42 of FIG. 2, if the transmission unit 44 does not establish the connection with the external apparatus, the transmission unit 44 may not transmit an acknowledgement mail and the notification unit 46 may execute the process of S52. In other words, the transmission unit 44 may not execute the processes of S44 to S50. Likewise, the transmission unit 44 may not execute the processes of S94 to S100.

(4) If the transmission unit 44 does not establish the connection with the external apparatus (NO in S96 or S100 of FIG. 3), the transmission unit 44 may transmit an acknowledgement mail through the SMTP server 64 and the notification unit 46 may display a specific image, which indicates that the transmission unit 44 does not establish the connection with the external apparatus, on the display unit 14.

(5) If a result of the determination is YES in S36 of FIG. 2, the transmission unit 44 may execute the process of S44 without executing the processes of S40 and S42. Likewise, the transmission unit 44 may not execute the processes of S90 and S92 of FIG. 3.

(6) The above technologies of the illustrative embodiments can be applied to the other communication apparatuses such as PC, server, printer, scanner, telephone and facsimile as well as the multi-function devices 10, 50.

(7) The multi-function device 10 may have a configuration of printing an email if receiving the email. In this case, it may be possible to execute the printing process of the received email after the disconnection process of S32 and the processes of preparing and transmitting the acknowledgement mail after S34 in parallel. Alternatively, it may be possible to perform the printing process and then the processes of preparing and transmitting the acknowledgement mail after S34.

(8) The email server 60 may not be connected to the LAN 4 inasmuch as it can communicate with the respective multi-function devices 10, 50.

While one aspect of the present invention has been specifically described with reference to the exemplary embodiments thereof, the exemplary embodiments are just exemplarily provided and do not limit the scope of the claims. The claims comprise the change and modification of the exemplary embodiments. In addition, the technical elements described and shown in the specification and the drawings provide the technical usefulness independently or in combination and are not limited to a combination of the claims at the time of filing this application. Further, the technologies exemplified in the specification or drawings achieve the purposes at the same time and have a technical usefulness inasmuch as one purpose is realized.

What is claimed is:

1. An email communication apparatus connected to an email server, the email communication apparatus comprising:
a processor; and
memory storing computer readable instructions, when executed by the processor, causing the email communication apparatus to execute processes comprising:
receiving an email of a first type through an email server to which the email communication apparatus is connected from a transmission source device, the email of the first type designating a first email address as a transmission destination of a first acknowledgement email of the first type, the first type defining the email which is to be transmitted through the email server according to a Simple Mail Transfer Protocol ("SMTP");
storing the first email address in the memory in response to receiving the email of the first type;

establishing a connection between the email communication apparatus and the transmission source device not through the email server;
storing an internet protocol ("IP") address of the transmission source device in the memory in response to establishing the connection;
receiving an email of a second type not through the email server from the transmission source device using the connection, the email of the second type designating a second email address as a transmission destination of a second acknowledgement email of the first type, the second type defining the email which is to be received or to be transmitted not through the email server according to a direct SMTP;
storing the second email address in the memory in response to receiving the email of the second type;
determining that the email of the first type is received if the IP address is not stored in the memory and that the email of the second type is received if the IP address is stored in the memory;
upon determining that the email of the first type is received, transmitting, through the email server according to the SMTP, the first acknowledgement email of the first type in response to the email of the first type, the first acknowledgement email of the first type designating the first email address stored in the memory as the transmission destination; and
upon determining that the email of the second type is received:
  transmitting a specific packet to the transmission source device using the IP address stored in the memory;
  determining whether the email communication apparatus receives a reply packet in response to the specific packet;
  establishing a connection between the email communication apparatus and the transmission source device using the IP address stored in the memory upon determining that the email communication apparatus receives the reply packet;
  in response to establishing the connection using the IP address stored in the memory, transmitting, to the transmission source device not through the email server according to the direct SMTP using the established connection, a third acknowledgement email of the second type in response to the email of the second type, wherein authentication information with which the transmission source device performs authentication of the email communication apparatus is transmitted not through the email server before the third acknowledgement email of the second type is transmitted, and upon determining that the email communication apparatus receives, from the transmission source device, information which indicates that an authentication process using the authentication information is successful, the third acknowledgement email of the second type is transmitted not through the email server; and
  upon determining that the email communication apparatus does not receive the reply packet even upon determining that the email of the second type is received, transmitting, through the email server according to the SMTP, the second acknowledgement email of the first type in response to the email of the second type, the second acknowledgement email of the first type designating the second email address stored in the memory as the destination.

2. The email communication apparatus according to claim 1, the computer readable instructions, when executed by the processor, causing the email communication apparatus to execute processes further comprising:
  notifying specific information to a user of the email communication apparatus in response to transmitting through the email server the second acknowledgement email of the first type.

3. The email communication apparatus according to claim 1, wherein the computer readable instructions when executed by the processor causes the email communication apparatus to execute:
  erasing the first email address from the memory in response to transmitting the first acknowledgement email of the first type designating the first email address through the email server in a case that it is determined that the email of the first type is received; and
  erasing the IP address and the email address from the memory in response to transmitting the third acknowledgement email of the second type not through the email server in a case that it is determined that the email of the second type is received.

4. The email communication apparatus according to claim 1, further comprising a printing unit configured to print the email of the first type if the email of the first type is received or the email of the second type if the email of the second type is received.

5. The email communication apparatus according to claim 1, wherein
  in transmitting the specific packet, the computer readable instructions when executed by the processor cause the email communication apparatus to execute transmitting the specific packet using a first combination of the IP address of the transmission source device and a first port number used in the connection, and
  upon determining that the email communication apparatus receives the reply packet, the email communication apparatus uses the connection established in response to transmitting the specific packet using the first combination to transmit the third acknowledgement email of the second type not through the email server according to the direct SMTP.

6. The email communication apparatus according to claim 5, wherein
  upon determining that the email communication apparatus does not receive the reply packet in response to the transmitting the specific packet using the first combination, the computer readable instructions when executed by the processor cause the email communication apparatus to execute transmitting the specific packet using a second combination of the IP address of the transmission source device and a second port number used in the connection, the second port number being different from the first port number, and
  upon determining that the email communication apparatus receives the reply packet in response to the transmitting the specific packet using the second combination, the email communication apparatus uses the connection established in response to the transmitting the specific packet using the second combination to transmit the third acknowledgement email of the second type not through the email server according to the direct SMTP.

7. The email communication apparatus according to claim 5, wherein the email of the second type includes the email address as the transmission destination of the acknowledgement, an email address of the transmission source device, and an email address of the email communication apparatus.

8. A non-transitory computer readable recording medium including instructions, when executed by a processor, causing an email communication apparatus that is connected to an email server to execute processes comprising:

receiving an email of a first type through an email server to which the email communication apparatus is connected from a transmission source device, the email of the first type designating a first email address as a transmission destination of a first acknowledgement email of the first type, the first type defining the email which is to be transmitted through the email server according to a Simple Mail Transfer Protocol ("SMTP");

storing the first email address in the memory in response to receiving the email of the first type;

establishing a connection between the email communication apparatus and the transmission source device not through the email server;

storing an internet protocol ("IP") address of the transmission source device in the memory in response to establishing the connection;

receiving an email of a second type not through the email server from the transmission source device using the connection, the email of the second type designating a second email address as a transmission destination of a second acknowledgement email of the first type, the second type defining the email which is to be received or to be transmitted not through the email server according to a direct SMTP;

storing the second email address in the memory in response to receiving the email of the second type;

determining that the email of the first type is not received if the IP address is stored in the memory and that the email of the second type is received if the IP address is stored in the memory;

upon determining that the email of the first type is received, transmitting, through the email server according to the SMTP, the first acknowledgement email of the first type in response to the email of the first type, the first acknowledgement email of the first type designating the first email address stored in the memory as the transmission destination; and upon determining that the email of the second type is received:

transmitting a specific packet to the transmission source device using the IP address stored in the memory;

determining whether the email communication apparatus receives a reply packet in response to the specific packet;

establishing a connection between the email communication apparatus and the transmission source device using the IP address stored in the memory upon determining that the email communication apparatus receives the reply packet;

in response to establishing the connection using the IP address stored in the memory, transmitting, to the transmission source device not through the email server according to the direct SMTP using the established connection, a third acknowledgement email of the second type in response to the email of the second type, wherein authentication information with which the transmission source device performs authentication of the email communication apparatus is transmitted not through the email server before the third acknowledgement email of the second type is transmitted, and upon determining that the email communication apparatus receives, from the transmission source device, information which indicates that an authentication process using the authentication information is successful, the third acknowledgement email of the second type is transmitted not through the email server; and upon determining that the email communication apparatus does not receive the reply packet even upon determining that the email of the second type is received, transmitting, through the email server according to the SMTP, the second acknowledgement email of the first type in response to the email of the second type, the second acknowledgment of the first type designating the second email address stored in the memory as the destination.

* * * * *